(12) United States Patent
Horel et al.

(10) Patent No.: US 9,185,234 B2
(45) Date of Patent: Nov. 10, 2015

(54) AUTOMATED ACCOUNT MAPPING IN A WIRELESS SUBSCRIBER BILLING SYSTEM

(75) Inventors: Gerald Charles Horel, Brentwood Bay (CA); Michelle Klein, San Diego, CA (US); Phil Tien Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2513 days.

(21) Appl. No.: 11/360,113

(22) Filed: Feb. 22, 2006

(65) Prior Publication Data

US 2007/0197189 A1    Aug. 23, 2007

(51) Int. Cl.
*H04M 11/00*     (2006.01)
*H04M 15/00*     (2006.01)
*G06Q 20/16*     (2012.01)
(Continued)

(52) U.S. Cl.
CPC ............... *H04M 15/00* (2013.01); *G06Q 20/16* (2013.01); *H04M 15/06* (2013.01); *H04M 15/41* (2013.01); *H04M 15/43* (2013.01); *H04M 15/48* (2013.01); *H04M 15/51* (2013.01); *H04M 15/68* (2013.01); *H04M 15/753* (2013.01); *H04M 15/755* (2013.01); *H04M 15/765* (2013.01); *H04M 15/77* (2013.01); *H04M 15/80* (2013.01); *H04M 15/8214* (2013.01); *H04M 15/8242* (2013.01); *H04W 4/24* (2013.01); *H04M 2215/0152* (2013.01); *H04M 2215/0156* (2013.01); *H04M 2215/0196* (2013.01); *H04M 2215/2026* (2013.01); *H04M 2215/54* (2013.01); *H04M 2215/724* (2013.01); *H04M 2215/7218* (2013.01); *H04M 2215/7222* (2013.01); *H04M 2215/7254* (2013.01); *H04M 2215/782* (2013.01); *H04M 2215/7846* (2013.01)

(58) Field of Classification Search
CPC ....................................................... H04W 4/24
USPC ........... 455/406; 379/114.27, 115.01; 705/77, 705/78
See application file for complete search history.

(56) References Cited

U.S. PATENT DOCUMENTS

| 628,294 A | 7/1899 | Ira |
| 4,156,903 A | 5/1979 | Barton et al. |
| 4,975,942 A | 12/1990 | Zebryk |

(Continued)

FOREIGN PATENT DOCUMENTS

| CA | 2267549 A1 | 9/2000 |
| CA | 2363220 A1 | 5/2003 |

(Continued)

OTHER PUBLICATIONS

Qualcomm Incorporated, "BREW Distribution System (BDS) Overview" Internet Citation, (Online) 2003, Retrieved from the Internet: URL: http://www.wirelessknowledge.com/brew/images/about/pdf/bds.pdf> (retrieved on Dec. 6, 2006), pp. 1-17.

(Continued)

*Primary Examiner* — Huy C Ho
(74) *Attorney, Agent, or Firm* — Satheesh K. Karra

(57) ABSTRACT

Systems and methods for automated account mapping in a wireless subscriber billing system are disclosed. An external ID associated with a wireless client device is captured from a billable event communicated between a wireless client device and a wireless subscriber billing system. Then, the external ID is associated with a Subscriber ID (SID) used to communicate a billing request to an operator billing system.

25 Claims, 4 Drawing Sheets

(51) Int. Cl.
  *H04M 15/06* (2006.01)
  *H04W 4/24* (2009.01)

(56) References Cited

U.S. PATENT DOCUMENTS

| | | | |
|---|---|---|---|
| 5,005,122 A | 4/1991 | Griffin et al. |
| 5,329,619 A | 7/1994 | Page et al. |
| 5,564,070 A | 10/1996 | Want et al. |
| 5,608,781 A | 3/1997 | Seiderman |
| 5,619,247 A | 4/1997 | Russo |
| 5,634,012 A | 5/1997 | Stefik et al. |
| 5,666,293 A | 9/1997 | Metz et al. |
| 5,666,397 A | 9/1997 | Lamons et al. |
| 5,761,485 A | 6/1998 | Munyan |
| 5,812,988 A | 9/1998 | Sandretto |
| 5,845,267 A | 12/1998 | Ronen |
| 5,852,812 A | 12/1998 | Reeder |
| 5,857,201 A | 1/1999 | Wright, Jr. et al. |
| 5,907,837 A | 5/1999 | Ferrel et al. |
| 5,940,752 A | 8/1999 | Henrick |
| 5,956,034 A | 9/1999 | Sachs et al. |
| 5,970,490 A | 10/1999 | Morgenstern |
| 5,986,690 A | 11/1999 | Hendricks |
| 6,035,281 A | 3/2000 | Crosskey et al. |
| 6,047,051 A | 4/2000 | Ginzboorg et al. |
| 6,088,717 A | 7/2000 | Reed et al. |
| 6,141,404 A | 10/2000 | Westerlage et al. |
| 6,151,606 A | 11/2000 | Mendez |
| 6,181,704 B1 | 1/2001 | Drottar et al. |
| 6,185,198 B1 | 2/2001 | LaDue |
| 6,185,683 B1 | 2/2001 | Ginter et al. |
| 6,202,051 B1 | 3/2001 | Woolston |
| 6,226,618 B1 | 5/2001 | Downs et al. |
| 6,230,168 B1 | 5/2001 | Unger et al. |
| 6,230,269 B1 | 5/2001 | Spies et al. |
| 6,253,189 B1 | 6/2001 | Feezell et al. |
| 6,253,239 B1 | 6/2001 | Shklar et al. |
| 6,253,326 B1 | 6/2001 | Lincke et al. |
| 6,263,326 B1 | 7/2001 | Chandra |
| 6,263,362 B1 | 7/2001 | Donoho et al. |
| 6,266,401 B1 | 7/2001 | Marchbanks et al. |
| 6,269,157 B1 | 7/2001 | Coyle |
| 6,282,294 B1 | 8/2001 | Deo et al. |
| 6,311,223 B1 | 10/2001 | Bodin et al. |
| 6,321,078 B1 | 11/2001 | Menelli et al. |
| 6,324,565 B1 | 11/2001 | Holt, III |
| 6,327,574 B1 | 12/2001 | Kramer et al. |
| 6,334,114 B1 | 12/2001 | Jacobs et al. |
| 6,334,116 B1 | 12/2001 | Ganesan et al. |
| 6,336,137 B1 | 1/2002 | Lee et al. |
| 6,343,318 B1 | 1/2002 | Hawkins et al. |
| 6,366,893 B2 * | 4/2002 | Hannula et al. ............ 705/40 |
| 6,381,325 B1 | 4/2002 | Hanson |
| 6,389,464 B1 | 5/2002 | Krishnamurthy et al. |
| 6,427,076 B2 | 7/2002 | Skog |
| 6,434,535 B1 | 8/2002 | Kupka et al. |
| 6,453,160 B1 | 9/2002 | Thomas et al. |
| 6,460,076 B1 | 10/2002 | Srinivasan |
| 6,463,534 B1 | 10/2002 | Geiger et al. |
| 6,493,722 B1 * | 12/2002 | Daleen et al. ............... 1/1 |
| 6,535,726 B1 | 3/2003 | Johnson |
| 6,549,770 B1 | 4/2003 | Marran |
| 6,597,903 B1 | 7/2003 | Dahm et al. |
| 6,598,026 B1 | 7/2003 | Ojha et al. |
| 6,606,744 B1 | 8/2003 | Mikurak |
| 6,622,017 B1 | 9/2003 | Hoffman |
| 6,628,934 B2 | 9/2003 | Rosenberg et al. |
| 6,665,711 B1 | 12/2003 | Boyle et al. |
| 6,683,941 B2 | 1/2004 | Brown et al. |
| 6,704,716 B1 | 3/2004 | Force |
| 6,721,716 B1 | 4/2004 | Gross |
| 6,741,980 B1 | 5/2004 | Langseth et al. |
| 6,742,043 B1 | 5/2004 | Moussa et al. |
| 6,754,320 B2 | 6/2004 | Daase et al. |
| 6,757,710 B2 | 6/2004 | Reed |
| 6,792,271 B1 | 9/2004 | Sherman et al. |
| 6,792,280 B1 | 9/2004 | Hori et al. |
| 6,816,721 B1 | 11/2004 | Rudisill |
| 6,820,121 B1 | 11/2004 | Callis et al. |
| 6,857,067 B2 | 2/2005 | Edelman |
| 6,873,936 B2 | 3/2005 | Reel et al. |
| 6,880,750 B2 | 4/2005 | Pentel |
| 6,883,142 B2 | 4/2005 | Shimamoto et al. |
| 6,928,441 B2 | 8/2005 | Haegele |
| 6,937,996 B1 | 8/2005 | Forsythe et al. |
| 6,941,139 B1 | 9/2005 | Shupe et al. |
| 6,941,270 B1 | 9/2005 | Hannula |
| 6,954,793 B2 | 10/2005 | Ramaswamy et al. |
| 6,955,883 B2 | 10/2005 | Margus et al. |
| 6,957,793 B2 | 10/2005 | Gautier et al. |
| 6,965,883 B2 | 11/2005 | Xu et al. |
| 6,978,273 B1 | 12/2005 | Bonneau et al. |
| 6,985,882 B1 | 1/2006 | Del Sesto |
| 6,996,537 B2 | 2/2006 | Minear et al. |
| 7,010,303 B2 | 3/2006 | Lewis et al. |
| 7,010,500 B2 | 3/2006 | Aarnio |
| 7,013,289 B2 | 3/2006 | Horn et al. |
| 7,020,688 B2 | 3/2006 | Sykes, Jr. |
| 7,039,389 B2 | 5/2006 | Johnson, Jr. |
| 7,043,447 B2 | 5/2006 | Hughes et al. |
| 7,047,405 B2 | 5/2006 | Mauro |
| 7,068,680 B1 | 6/2006 | Kaltenmark et al. |
| 7,099,891 B2 | 8/2006 | Harris et al. |
| 7,113,766 B2 | 9/2006 | Horel |
| 7,117,504 B2 | 10/2006 | Smith et al. |
| 7,155,205 B2 | 12/2006 | Cerami et al. |
| 7,177,837 B2 | 2/2007 | Pegaz-Paquet et al. |
| 7,184,747 B2 * | 2/2007 | Bogat ............................ 455/406 |
| 7,200,566 B1 | 4/2007 | Moore et al. |
| 7,206,842 B2 | 4/2007 | Nainani et al. |
| 7,218,917 B2 | 5/2007 | Pradhan et al. |
| 7,228,333 B1 | 6/2007 | Smith |
| 7,233,790 B2 | 6/2007 | Kjellberg et al. |
| 7,260,194 B1 | 8/2007 | Meyers et al. |
| 7,269,654 B2 | 9/2007 | Srinivas |
| 7,278,164 B2 | 10/2007 | Raiz et al. |
| 7,286,655 B2 | 10/2007 | Voorman et al. |
| 7,293,099 B1 | 11/2007 | Kalajan |
| 7,334,025 B2 | 2/2008 | Kuriya |
| 7,362,745 B1 | 4/2008 | Cope et al. |
| 7,370,120 B2 | 5/2008 | Kirsch et al. |
| 7,404,148 B2 | 7/2008 | Lincke et al. |
| 7,415,439 B2 | 8/2008 | Kontio et al. |
| 7,436,816 B2 | 10/2008 | Mehta et al. |
| 7,444,411 B2 | 10/2008 | Sung et al. |
| 7,467,198 B2 | 12/2008 | Goodman et al. |
| 7,490,045 B1 | 2/2009 | Flores et al. |
| 7,526,450 B2 | 4/2009 | Hughes et al. |
| 7,574,377 B2 * | 8/2009 | Carapelli ....................... 705/26 |
| 7,577,616 B2 | 8/2009 | Zhu |
| 7,583,953 B2 | 9/2009 | Choi et al. |
| 7,660,755 B2 | 2/2010 | Amato et al. |
| 7,711,680 B2 | 5/2010 | Barnes-Leon et al. |
| 7,752,217 B2 | 7/2010 | Sawashima et al. |
| 7,894,803 B2 | 2/2011 | Kamada |
| 7,904,528 B2 | 3/2011 | Zilliacus et al. |
| 7,907,937 B2 | 3/2011 | Engelhart |
| 8,028,056 B1 | 9/2011 | Krishna et al. |
| 8,150,736 B2 | 4/2012 | Horn et al. |
| 8,489,470 B2 | 7/2013 | Kahlon et al. |
| 2001/0013020 A1 | 8/2001 | Yoshida et al. |
| 2001/0032254 A1 | 10/2001 | Hawkins |
| 2001/0034686 A1 | 10/2001 | Eder |
| 2001/0036271 A1 | 11/2001 | Javed |
| 2001/0037304 A1 | 11/2001 | Paiz |
| 2001/0056362 A1 | 12/2001 | Hanagan et al. |
| 2002/0002603 A1 | 1/2002 | Vange |
| 2002/0004935 A1 | 1/2002 | Huotari et al. |
| 2002/0019764 A1 | 2/2002 | Mascarenhas |
| 2002/0022472 A1 | 2/2002 | Watler et al. |
| 2002/0022971 A1 | 2/2002 | Tanaka et al. |
| 2002/0029197 A1 | 3/2002 | Kailamaki et al. |
| 2002/0029200 A1 | 3/2002 | Dulin et al. |
| 2002/0035688 A1 | 3/2002 | Kutaragi et al. |

(56) References Cited

U.S. PATENT DOCUMENTS

| | | |
|---|---|---|
| 2002/0035699 A1 | 3/2002 | Crosbie |
| 2002/0049717 A1 | 4/2002 | Routtenberg et al. |
| 2002/0052754 A1* | 5/2002 | Joyce et al. ............... 705/1 |
| 2002/0052968 A1 | 5/2002 | Bonefas et al. |
| 2002/0062290 A1 | 5/2002 | Ricci |
| 2002/0069176 A1 | 6/2002 | Newman |
| 2002/0069244 A1 | 6/2002 | Blair et al. |
| 2002/0069263 A1 | 6/2002 | Sears et al. |
| 2002/0071559 A1 | 6/2002 | Christensen et al. |
| 2002/0083006 A1 | 6/2002 | Headings et al. |
| 2002/0083050 A1 | 6/2002 | Liu et al. |
| 2002/0107706 A1 | 8/2002 | Oliver et al. |
| 2002/0107795 A1 | 8/2002 | Minear et al. |
| 2002/0107809 A1 | 8/2002 | Biddle et al. |
| 2002/0109706 A1 | 8/2002 | Lincke et al. |
| 2002/0111904 A1 | 8/2002 | Gruber et al. |
| 2002/0128908 A1 | 9/2002 | Levin et al. |
| 2002/0129165 A1 | 9/2002 | Dingsor et al. |
| 2002/0131401 A1 | 9/2002 | Ehreth |
| 2002/0131404 A1 | 9/2002 | Mehta et al. |
| 2002/0160752 A1 | 10/2002 | Hook et al. |
| 2002/0162112 A1 | 10/2002 | Javed |
| 2002/0165822 A1 | 11/2002 | Makipaa |
| 2002/0176553 A1 | 11/2002 | Aschir |
| 2002/0194143 A1 | 12/2002 | Banerjee et al. |
| 2003/0005136 A1* | 1/2003 | Eun ............... 709/229 |
| 2003/0023550 A1 | 1/2003 | Lee |
| 2003/0028903 A1 | 2/2003 | Hofrichter et al. |
| 2003/0046396 A1 | 3/2003 | Richter et al. |
| 2003/0051047 A1 | 3/2003 | Horel et al. |
| 2003/0060188 A1 | 3/2003 | Gidron et al. |
| 2003/0074328 A1 | 4/2003 | Schiff et al. |
| 2003/0078844 A1 | 4/2003 | Takatori et al. |
| 2003/0078886 A1 | 4/2003 | Minear et al. |
| 2003/0078895 A1* | 4/2003 | MacKay ............... 705/64 |
| 2003/0083973 A1 | 5/2003 | Horsfall |
| 2003/0083991 A1 | 5/2003 | Kikinis |
| 2003/0093461 A1 | 5/2003 | Suzuki et al. |
| 2003/0093565 A1 | 5/2003 | Berger et al. |
| 2003/0096591 A1 | 5/2003 | Pohutsky et al. |
| 2003/0110044 A1 | 6/2003 | Nix et al. |
| 2003/0110213 A1 | 6/2003 | Munetsugu et al. |
| 2003/0120594 A1 | 6/2003 | Shaginaw et al. |
| 2003/0149958 A1 | 8/2003 | Baluja et al. |
| 2003/0151621 A1 | 8/2003 | McEvilly et al. |
| 2003/0208444 A1 | 11/2003 | Sauer |
| 2003/0212904 A1 | 11/2003 | Randle et al. |
| 2003/0233329 A1 | 12/2003 | Laraki et al. |
| 2003/0236867 A1 | 12/2003 | Natsuno et al. |
| 2004/0006517 A1 | 1/2004 | Takatori |
| 2004/0015413 A1 | 1/2004 | Abu-Hejleh et al. |
| 2004/0015562 A1 | 1/2004 | Harper et al. |
| 2004/0030601 A1 | 2/2004 | Pond et al. |
| 2004/0032936 A1 | 2/2004 | Horel et al. |
| 2004/0043753 A1 | 3/2004 | Wake et al. |
| 2004/0044623 A1* | 3/2004 | Wake et al. ............... 705/40 |
| 2004/0137890 A1 | 7/2004 | Kalke |
| 2004/0139012 A1 | 7/2004 | Koskinen et al. |
| 2004/0181591 A1 | 9/2004 | Yu et al. |
| 2004/0267630 A1 | 12/2004 | Au et al. |
| 2005/0086348 A1 | 4/2005 | Balassanian |
| 2005/0090258 A1 | 4/2005 | Coppinger et al. |
| 2005/0113092 A1 | 5/2005 | Coppinger et al. |
| 2005/0114155 A1 | 5/2005 | Hodges et al. |
| 2005/0125315 A1 | 6/2005 | Munoz et al. |
| 2005/0132049 A1 | 6/2005 | Inoue et al. |
| 2005/0148319 A1 | 7/2005 | Himeno |
| 2005/0289047 A1 | 12/2005 | Oliver et al. |
| 2006/0014535 A1 | 1/2006 | Walker et al. |
| 2006/0080232 A1* | 4/2006 | Epps ............... 705/39 |
| 2006/0143119 A1 | 6/2006 | Krueger et al. |
| 2006/0173758 A1 | 8/2006 | Minear et al. |
| 2006/0235931 A1 | 10/2006 | Ruthe et al. |
| 2006/0253350 A1 | 11/2006 | Falkenhain et al. |
| 2006/0270386 A1 | 11/2006 | Yu et al. |
| 2006/0271449 A1 | 11/2006 | Oliver et al. |
| 2007/0003034 A1 | 1/2007 | Schultz et al. |
| 2007/0038703 A1 | 2/2007 | Tendjoukian et al. |
| 2007/0066279 A1 | 3/2007 | Silverbrook et al. |
| 2007/0083464 A1 | 4/2007 | Cordero Torres et al. |
| 2007/0123229 A1* | 5/2007 | Pousti ............... 455/414.1 |
| 2007/0169163 A1 | 7/2007 | Morio et al. |
| 2007/0174308 A1 | 7/2007 | Rausch |
| 2007/0197188 A1 | 8/2007 | Sprigg et al. |
| 2011/0030042 A1 | 2/2011 | Neal-Joslin |
| 2011/0143709 A1* | 6/2011 | Pousti ............... 455/406 |
| 2012/0309345 A1 | 12/2012 | Wake et al. |

FOREIGN PATENT DOCUMENTS

| | | |
|---|---|---|
| CN | 1459183 A | 11/2003 |
| EP | 0780802 A2 | 6/1997 |
| EP | 0895148 A1 | 2/1999 |
| EP | 1026610 A2 | 8/2000 |
| EP | 1026853 A1 | 8/2000 |
| EP | 1033652 | 9/2000 |
| EP | 1047030 A2 | 10/2000 |
| EP | 1102191 A2 | 5/2001 |
| EP | 1122967 A2 | 8/2001 |
| EP | 1162807 A2 | 12/2001 |
| EP | 1204054 A2 | 5/2002 |
| EP | 1403797 A1 | 3/2004 |
| EP | 1404100 A1 | 3/2004 |
| EP | 1414185 | 4/2004 |
| FR | 2775550 A1 | 9/1999 |
| GB | 2349548 A | 11/2000 |
| JP | 07044261 | 2/1995 |
| JP | 07319691 A | 12/1995 |
| JP | 9319573 A | 12/1997 |
| JP | 1066050 | 3/1998 |
| JP | 1014028 A | 5/1998 |
| JP | 10260873 A | 9/1998 |
| JP | 10262059 A | 9/1998 |
| JP | 11053185 A | 2/1999 |
| JP | 11055252 A | 2/1999 |
| JP | 11069017 A | 3/1999 |
| JP | 11126188 A | 5/1999 |
| JP | 200056967 | 2/2000 |
| JP | 2000078129 A | 3/2000 |
| JP | 2000357196 A | 12/2000 |
| JP | 2001195451 A | 7/2001 |
| JP | 2001202434 A | 7/2001 |
| JP | 2001243382 A | 9/2001 |
| JP | 2001250069 A | 9/2001 |
| JP | 2001265938 | 9/2001 |
| JP | 2001268623 A | 9/2001 |
| JP | 2001312324 A | 11/2001 |
| JP | 2001312666 A | 11/2001 |
| JP | 2001319168 A | 11/2001 |
| JP | 2001320509 A | 11/2001 |
| JP | 2001325234 A | 11/2001 |
| JP | 2001352583 | 12/2001 |
| JP | 2002007839 A | 1/2002 |
| JP | 2002015160 A | 1/2002 |
| JP | 2002027151 | 1/2002 |
| JP | 2002091850 A | 3/2002 |
| JP | 2002093361 A | 3/2002 |
| JP | 2002094450 A | 3/2002 |
| JP | 200299441 | 4/2002 |
| JP | 2002099289 A | 4/2002 |
| JP | 2002101315 A | 4/2002 |
| JP | 2002109395 A | 4/2002 |
| JP | 2002132367 | 5/2002 |
| JP | 2002133316 A | 5/2002 |
| JP | 2002163258 | 6/2002 |
| JP | 2002163467 A | 6/2002 |
| JP | 2002175387 A | 6/2002 |
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002353885 A | 12/2002 |
| JP | 2003016041 A | 1/2003 |

(56) References Cited

FOREIGN PATENT DOCUMENTS

| | | |
|---|---|---|
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005505072 A | 2/2005 |
| JP | 2005078325 A | 3/2005 |
| JP | 2005519407 A | 6/2005 |
| JP | 2005198021 A | 7/2005 |
| JP | 2005537544 | 12/2005 |
| JP | 2006505966 A | 2/2006 |
| JP | 2006520173 | 8/2006 |
| JP | 2007527570 A | 9/2007 |
| JP | 2008514743 A | 5/2008 |
| JP | 2010178027 A | 8/2010 |
| JP | 4685351 | 2/2011 |
| KR | 200072521 | 12/2000 |
| KR | 20010078968 | 8/2001 |
| KR | 20020039648 | 5/2002 |
| KR | 20030042660 A | 6/2003 |
| KR | 1020030050565 | 6/2003 |
| KR | 20030078446 | 10/2003 |
| KR | 1020040019840 | 3/2004 |
| KR | 20070007954 | 1/2007 |
| RU | 2165679 C1 | 4/2001 |
| RU | 2191482 C1 | 10/2002 |
| RU | 2212057 | 9/2003 |
| RU | 2298225 | 4/2007 |
| TW | 161301 | 6/1991 |
| TW | 388021 B | 4/2000 |
| TW | 466858 B | 12/2001 |
| TW | 499645 B | 8/2002 |
| WO | WO-9308545 A1 | 4/1993 |
| WO | WO-9726739 A1 | 7/1997 |
| WO | WO-9745814 A1 | 12/1997 |
| WO | WO-9821676 | 5/1998 |
| WO | WO-9931610 A1 | 6/1999 |
| WO | WO-9941861 A1 | 8/1999 |
| WO | WO-9952077 A1 | 10/1999 |
| WO | WO-0002112 A2 | 1/2000 |
| WO | WO-0031672 A1 | 6/2000 |
| WO | 0043962 | 7/2000 |
| WO | WO-0056033 A1 | 9/2000 |
| WO | WO-0079451 A1 | 12/2000 |
| WO | WO-0143390 A2 | 6/2001 |
| WO | 0150305 A2 | 7/2001 |
| WO | WO0149048 A1 | 7/2001 |
| WO | WO-0163532 | 8/2001 |
| WO | WO-0163900 A1 | 8/2001 |
| WO | WO-0169891 A1 | 9/2001 |
| WO | WO-0197104 A1 | 12/2001 |
| WO | WO-0203219 A1 | 1/2002 |
| WO | WO-0231718 A1 | 4/2002 |
| WO | WO-0044892 | 6/2002 |
| WO | WO-02063536 A2 | 8/2002 |
| WO | WO-02063537 A2 | 8/2002 |
| WO | WO-02067600 A1 | 8/2002 |
| WO | 02073934 | 9/2002 |
| WO | WO-02093361 A1 | 11/2002 |
| WO | WO02103459 A2 | 12/2002 |
| WO | WO-03017171 A1 | 2/2003 |
| WO | 03032618 | 4/2003 |
| WO | WO-03050743 A1 | 6/2003 |
| WO | 03075584 A2 | 9/2003 |
| WO | 03079256 A1 | 9/2003 |
| WO | WO03085943 A1 | 10/2003 |
| WO | WO-2004003708 A2 | 1/2004 |
| WO | WO-2004021131 A2 | 3/2004 |
| WO | 2004084526 A2 | 9/2004 |
| WO | WO-2004082245 A2 | 9/2004 |
| WO | 2005008383 A2 | 1/2005 |
| WO | WO-2005004456 A1 | 1/2005 |
| WO | WO-2005020027 A2 | 3/2005 |
| WO | WO2005069917 | 8/2005 |
| WO | WO-2006130539 A2 | 12/2006 |

OTHER PUBLICATIONS

International Search Report—PCT/US07/062611, International Search Authority—European Patent Office—Oct. 15, 2007.
Written Opinion—PCT/US2007/062611, International Search Authority, European Patent Office, Oct. 15, 2007.
Anonymous, "BPM in Action: iUNIVERSE," Intelligent Enterprise, San Mateo, May 15, 2004, vol. 7, Issue 8, 2 pages. (recovered from ProQuest on Jun. 5, 2009).
Anonymous: "Brew TM Application Note: Developing Brew Applications for Devices with Ruim Units", May 14, 2005, pp. 1-11, XP007920607, Retrieved from the Internet: URL:http://web.archive.org/web/20050514075656/http://brew.qualcomm.com/brew_bnry/pdf/developer/resources/ds/Dev_BREW_Apps.pdf.
Anonymous: "Internet Archive Wayback Machine", Internet Citation, May 14, 2005, p. 1, XP007920684, Retrieved from the Internet: URL:http://wayback.archive.org/web/200506150000007*/http://brew.qualcomm.com/brew_bnry/pdf/developer/resources/ds/Dev_BREW_Apps.pdf [retrieved on Jun. 4, 2012].
Arar, Yardena, "Download apps to a phone," PC World, Jun. 2002, v20i6 pgs. 64, Proquest #120993020 3 pgs.
Atsuyuki Morishima, "Efficient Construction of Materialized XML Views With Silkroute", IPSJ SIG Notes, Japan, Information Processing Society of Japan, Jul. 17, 2001, Vol. 2001, No. 70, pp. 421-428.
Business Wire, "Informix Announces Key Customer Wins in Fourth Quarter; Leading Companies and Government Entities in Key Markets Around the World Respond to Informers Technology Strategy", Business/Technology Editors. Business Wire. New York: Jan. 27, 1999, pp. 1-8.
Butrico M A et al: "Gold Rush: Mobile Transaction Middleware With Java-Object Replication" Conference on Object- Oriented Technologies, (Jun. 16, 1997), pp. 91-101.
Classified Ad 3—No Title, New York Daily Times (1851-1857); Nov. 15, 1853; ProQuest Historical Newspapers: The New York Times (1851-2008) p. 4.
Classified Ad 74—No Title. Chicago Daily Tribune (1923-1963); Oct. 11, 1959; ProQuest Historical Newspapers: Chicago Tribune (1849-1989) p. G34.
Declaration of Non-Establishment of International Search Report—PCT/US2005/022837, International Search Authority—European Patent Office, Sep. 22, 2005.
"Ellipsus' Mobile Aplication Provisioning System", Internet Citation, Dec. 2, 2001, XP002266188, Retrieved from the Internet: URL: web.archive.orgfwww.ellipsus.com [retrieved on Jan. 7, 2004].
EPO: "Notice From the European Patent Office Dated Oct. 1, 2007 Concerning Business Methods", Journal of the European Patent Office—Vol. 30, No. 11, Nov. 1, 2007, pp. 592-593, XP007905525, ISSN: 01709291.
Fujii, H. "BREW application, flexibility in development comparable to PCs, powerful in enterprise system cooperation of cellular phones," Solution IT, vol. 14, No. 11, Japan, RIC Telecom, Nov. 1, 2002, pp. 22-24.
Goldenberg-Hart, Diane, "A Glossary of Selected Internet and Computing Terms," Yale University Library, Jun. 1996. Retrieved from http://www.library.yale.edu/ref/internet/intgloss.htm.
"How can wireless models help my business?", Computer Weekly, Dec. 2, 2003; pp. 1-5, Available from: Business Source Complete, Ipswich, MA. Accessed Jul. 1, 2013.
M2 Presswire. Convergys: Genie Mobile chooses Geneva Billing software, continuing the momentum of the merger between Convergys and Geneva Technology. Coventry: Jun. 1, 2001, p. 1.
Mcauliffe W., "Broadband heading for move to metered billing", New Media Age, Apr. 29, 2004; p. 1, Available from: Business Source Complete, Ipswich, MA. Accessed Jul. 1, 2013.
No Author, "AvantGo 4.0 Powers Wireless Applications and Services," Customer Inter@ction Solutions, May 2001, vol. 19, Issue 11, p. 71.

(56) References Cited

OTHER PUBLICATIONS

No Author, "Sony Pictures to Sell Movies via Internet," Jul. 9, 2001, Source: Japan Computer Industry Scan.
Oommen P., "Over the Air Handset Management," Emerging Technologies Symposium, Broadband, Wireless Internet Access, 2000, IEEE Apr. 10-11, 2000, Piscataway, NJ, USA, IEEE, Apr. 10, 2000, pp. 1-4, XP010538894, ISBN: 0-7803-6364-7.
PR Newswire. China Unicom Selects Qualcomm's BREW Solution as Its Platform to Launch Wireless Data Applications. New York, Aug. 26, 2002, p. 1.
PR Newswire, "Diebold Teams with Health System Services to Offer a Complete Distribution Package for Pharmacy Medication and Supplies". New York: May 28, 1998. pp. 1-3.
Qualcomm; "Binary Runtime Environment for Wireless, BREW Application note: Developing BREW Applications for Devices with RUIM Units" (Online) Jan. 10, 2005, pp. 1-11, XP002410586 San Diego Retrieved from the internet: URL:http://brew_qualcomm.com/brew_bnry/pdf/developer/resources/ds/Dev_BREW_Apps.pdf> [retrieved on Dec. 16, 2006].
Rigdon, Joan E., "CyberSource Begins to Offer Software of Symantec and Others on the Internet," Wall Street Journal, Jan. 31, 1995.
Syncml Consortium: "SYNCML Sync Protocol, Version 1.0" (Dec. 7, 2000), Chapters 1,2,5-8.
SYNCML Consortium: "SYMCML Sync Protocol, Version 1.0.1" (Jun. 15, 2001).
Telesens: TelesensKSCL and Comptel sign strategic agreement; New alliance expands best of suite billing offering and furthers drive towards comprehensive next generation solution for network service providers M2 Presswire, Coventry, Nov. 28, 2000, p. 1.
USA Group Selects Click-N-Done for Electronic Bill Presentment and Payment; Software Will Support Online Presentment and Payment for Education Loan Borrowers Business Editors, Internet Writers. Business Wire. New York: Apr. 24, 2000. p. 1.
"SYNCML Representation Protocol, Version 1.0" Syncml Representation Protocol, (Dec. 7, 2000), pp. 1-104, Chapters 1-4.
Floyd R, et al., "Mobile Web Access Using Enetwork Web Express", IEEE Personal Communications, IEEE Communications Society, US, vol. 5, No. 5, Oct. 1, 1998, pp. 47-52, XP000786616.
Seifert A., et al. "A Multi-Version Cache Replacement and Prefetching Policy for Hybrid Data Delivery Environments," Proceeding VLBD '02 Proceedings of the 28th international conference on Very Large, Jan. 1, 2002, pp. 850-861, XP055148735.

\* cited by examiner and hand-held PDAs. However, these smaller and more powerful personal computing devices are typically severely resource constrained. For example, the screen size, amount of available memory and file system space, amount of input and output capabilities (e.g., size of keypad and display) and processing capability may each be limited by the small size of the device. Because of such severe resource constraints, it is often typically desirable, for example, to maintain a limited size and quantity of software applications and other information residing on such remote personal computing devices (client devices).

AUTOMATED ACCOUNT MAPPING IN A WIRELESS SUBSCRIBER BILLING SYSTEM

BACKGROUND OF THE INVENTION

1. Field

The present invention generally relates to wireless subscriber billing systems, and more specifically to automated account mapping for an external purchase charged to the wireless subscriber.

2. Background

Advances in technology have resulted in smaller and more powerful personal computing devices. For example, there currently exist a variety of portable personal computing devices, including laptops, wireless computing devices, such as portable wireless telephones, personal digital assistants (PDAs) and paging devices that are each small, lightweight, and can be easily carried by users. A wireless device is any device that can communicate with other devices without being physically attached to them. Most wireless devices communicate with each other through radio frequencies.

More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities (e.g., size of keypad and display) and processing capability may each be limited by the small size of the device. Because of such severe resource constraints, it is often typically desirable, for example, to maintain a limited size and quantity of software applications and other information residing on such remote personal computing devices (client devices).

Some of the personal computing devices utilize an application programming interface (API) or application programming interfaces (APIs), sometimes referred to as runtime environments and software platforms, that are installed onto their local computer platform and which are used, for example, to simplify operations of such devices, such as by providing generalized calls for device specific resources. Generally, an API can be considered a set of routines used by an application program to direct the performance of procedures by the computer's operating system.

Further, some such APIs are also known to provide software developers the ability to create software applications that are fully executable on such devices. In addition, some APIs are known to provide mechanisms for secure communications between such personal devices (i.e., clients) and remote devices (i.e., servers) using secure cryptographic information.

Examples of such APIs include versions of the Binary Runtime Environment for Wireless software (BREW®)) developed by QUALCOMM, Inc., of San Diego, Calif. BREW® can cooperate with a computing device's (e.g., a wireless cellular phone) operating system, and can, among other features, provide interfaces to hardware features particularly found on computing devices. BREW® can also provide these interfaces on such computing devices at a relatively low cost with respect to demands on device resources and with respect to the price paid by consumers for devices containing BREW®. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

In conventional wireless systems, a wireless client device can obtain these additional services, application and/or content from one or more servers. Typically, a server that controls billing will associate a specific Subscriber Identification (SID) to the transaction so that the transaction can be billed to the appropriate account. The SID may not be any number known to the subscriber and therefore may not be usable outside the wireless client device-to-server transaction environment. Accordingly, this limits the ability for wireless subscribers to use their established accounts for purchases other than those hosted by their carrier/operators.

The foregoing description of the related art is merely intended to provide an overview of some of the billing related processes in wireless subscriber systems and as an introduction to the BREW®) platform, which can be used in embodiments of the invention. However, the invention is not to be construed as being limited to a specific implementation, operating platform or environment.

SUMMARY OF THE EXEMPLARY EMBODIMENTS

Exemplary embodiments of the present invention are directed to a system and method, for automated account mapping in a wireless subscriber billing system.

Accordingly, an embodiment of the invention can include a method comprising: capturing an external ID associated with a wireless client device from a billable event communicated between the wireless client device and a wireless subscriber billing system; and associating the external ID with a Subscriber ID (SID) used to communicate a billing request to an operator billing system.

Another embodiment of the invention includes an apparatus comprising: logic configured to capture an external ID associated with a wireless client device from a billable event communicated between the wireless client device and a wireless subscriber billing system; and logic configured to associate the external ID with a Subscriber ID (SID) used to communicate a billing request to an operator billing system.

Another embodiment of the invention includes a computer-readable medium on which is stored a computer program for automated account mapping in a wireless subscriber billing system, the computer program comprising instructions which, upon being executed, causes the computing device to perform a process of: capturing an external ID associated with a wireless client device from a billable event communicated between the wireless client device and a wireless subscriber billing system; associating the external ID with a Subscriber ID (SID) used to communicate a billing request to an operator billing system; receiving the billing request from an external billing source at the wireless subscriber billing system; and mapping the external ID contained in the billing request to the subscriber ID (SID).

Another embodiment of the invention includes a server comprising: means for capturing an external ID associated with a wireless client device from a billable event communicated between the wireless client device and a wireless subscriber billing system; means for associating the external ID with a Subscriber ID (SID) used to communicate a billing request to an operator billing system; means for receiving the billing request from an external billing source at the wireless subscriber billing system; and means for mapping the external ID contained in the billing request to the subscriber ID (SID).

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Figure 1:
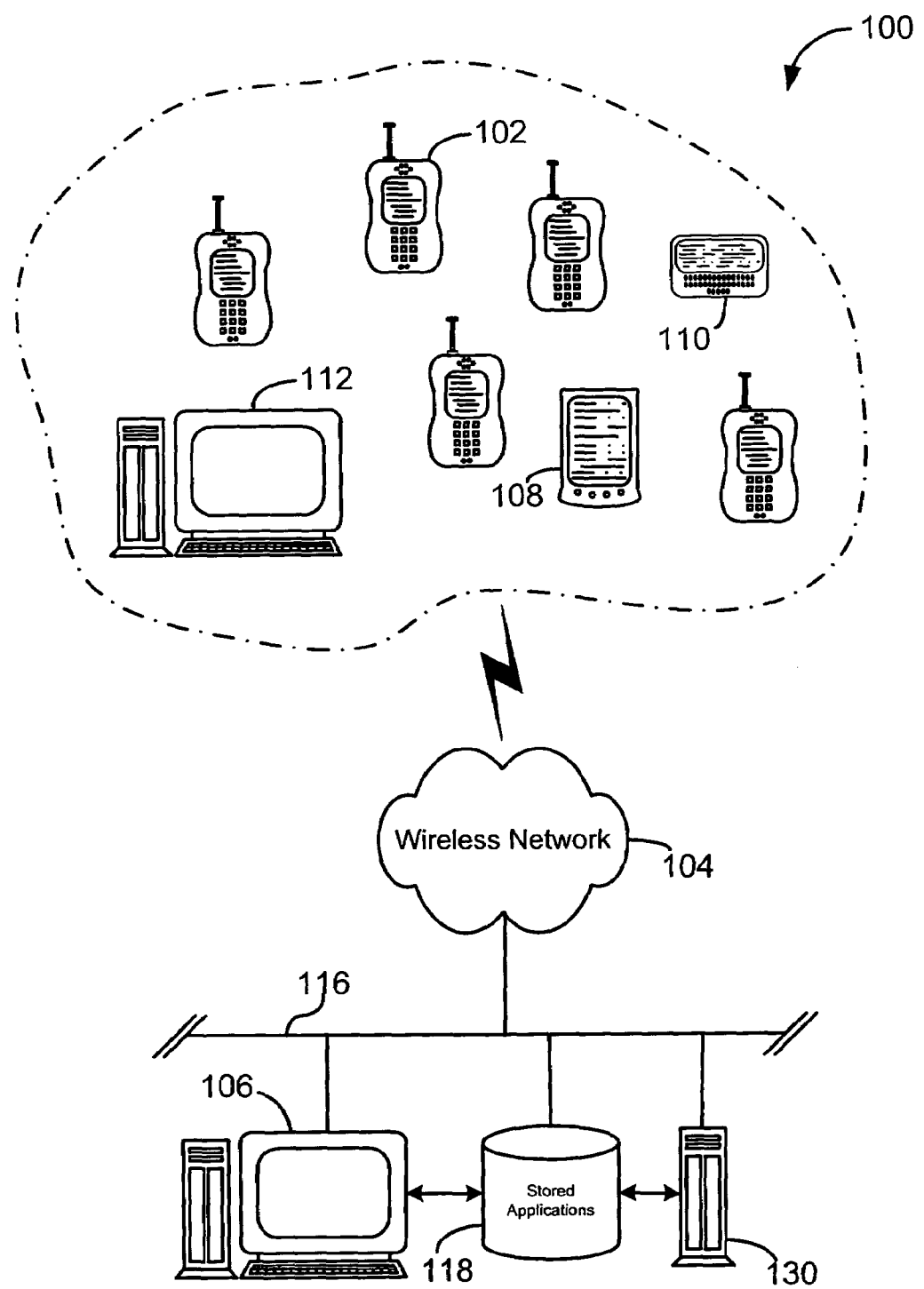
FIG. 1 is a diagram of a wireless network architecture that supports the client devices and servers in accordance with at least one embodiment of the invention.

Embodiments of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the terms "embodiments" or "embodiments of the invention" does not require that all embodiments of the invention include the discussed feature, advantage or mode of operation.

Further, many embodiments are described in terms of sequences of actions to be performed by, for example, elements of a computing device. Also, those skilled in the art will appreciate that action sequences, method steps and functions can be interchanged without departing from the spirit and scope of the invention. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention may be used in conjunction with a runtime environment or platform executing on the computing device. One such runtime environment is the BREW® software previously discussed. However, one or more embodiments of the invention may be used with other types of runtime environments that, for example, operate to control the execution of applications on wireless client computing devices.

Additionally, it will be recognized to those skilled in the art that an application file type being distributed and executed may be describe herein for simplicity of description. However, an "application" may also include files having executable content, such as: object code, scripts, java file, a bookmark file (or PQA file), WML scripts, byte code, and perl scripts. In addition, an "application" referred to herein, may also include files that are not executable in nature, such as documents that may need to be opened or other data files that need to be accessed.

FIG. 1 illustrates a block diagram of one exemplary embodiment of a wireless system 100 in accordance with at least one embodiment of the invention. System 100 can contain client devices, such as cellular telephone 102, in communication across a wireless network 104 with at least one application download server (ADS) 106 that selectively transmits software applications and components to wireless devices across a wireless communication portal or other data access to the wireless network 104. As shown here, the wireless (client) device can be a cellular telephone 102, a personal digital assistant 108, a pager 110, which is shown here as a two-way text pager, or even a separate computer platform 112 that has a wireless communication portal. This separate computer platform 112 may be fixed (e.g. desktop) or mobile (e.g. laptop). The embodiments of the invention may thus be realized on any form of client device including a wireless communication portal or having wireless communication capabilities, including without limitation, wireless modems, PCMCIA cards, personal computers, access terminals, telephones, or any combination or sub-combination thereof.

The application download server (ADS) 106 is shown here on a network 116 with other computer elements in communication with the wireless network 104. There can be a stand-alone billing server 130, and each server can provide separate services and processes to the client devices 102, 108, 110, 112 across the wireless network 104. There may also be at least one stored application database 118 that holds the software applications and content which are downloadable by the wireless devices 102, 108, 110, 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality. Further, not all of the elements (e.g., pager 110, ADS 106, database 118, etc.) illustrated are necessarily used in all the different embodiments of the invention.

Figure 2:
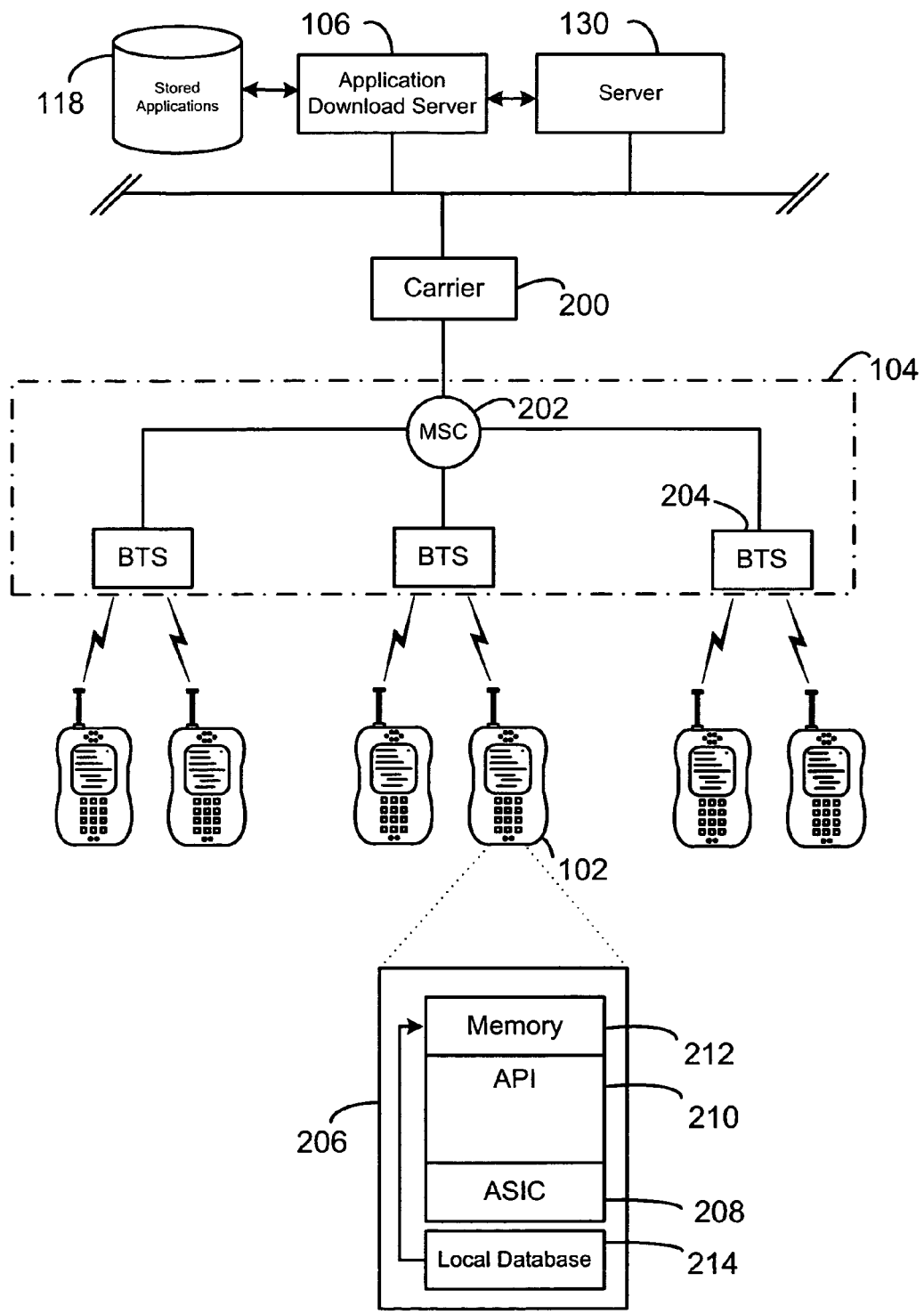
FIG. 2 is a more detailed diagram of a wireless network architecture that supports the client devices and servers in accordance with at least one embodiment of the invention.

In FIG. 2, a block diagram is shown that more fully illustrates system 100, including the components of the wireless network 104 and interrelation of the elements of the exemplary embodiments of the invention. System 100 is merely exemplary and can include any system that allows remote client devices, such as wireless client computing devices 102, 108, 110, 112 to communicate over-the-air between and among each other and/or between and among components connected via a wireless network 104, including, without limitation, wireless network carriers and/or servers. The application download server 106 and the stored application database 118, along with any other servers such as billing server 130 which can be used to provide cellular telecommunication services, communicate with a carrier network 200, through a data link, such as the Internet, a secure LAN, WAN, or other network. The application download server 106, server 130 and the stored application database 118 are illustrated as independent devices in this embodiment. However, these devices can also be integrated into one common server or the functionality of one or more may be distributed over multiple devices, as will be appreciated by those skilled in the art.

The carrier network 200 controls messages (typically sent as data packets) to a mobile switching center or messaging service controller (MSC) 202. The carrier network 200 communicates with the MSC 202 by a network, the Internet and/or a public switched telephone network (PSTN). Typically, the network or Internet connection between the carrier network 200 and the MSC 202 transfers data, and the PSTN connection to the MSC 202 transfers voice information. The MSC 202 can be connected to multiple base stations (BTS) 204. In a similar manner to the carrier network, the MSC 202 is typically connected to the BTS 204 by a network, the Internet and/or PSTN to communicate data and/or voice information. The BTS 204 can broadcast data messages wirelessly to the client devices, such as cellular telephone 102, by short messaging service (SMS), or other over-the-air (OTA) methods known in the art.

The client device, (here a wireless client computing device), such as cellular telephone 102, may have a computer platform 206 that can receive and execute software applications or content and/or commands transmitted from the application download server 106 and/or server 130. The computer platform 206 can include an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The computer platform 206 also includes a local database 214 that can hold applications not actively used in memory 212. The local database 214 is typically a flash memory cell, but can be any secondary storage device as known in the art, such as magnetic media, EEPROM, optical media, tape, soft or hard disk, and the like.

The wireless client computing device, such as cellular telephone 102, can have installed on it, or otherwise downloads, one or more software applications, such as games, news, stock monitors, and the like. For example, the cellular telephone 102 may receive one or more software applications and/or content downloaded from the download server 106. The software applications and content may be stored on the local database 214 when not in use. The cellular telephone 102 or other wireless computing device may upload resident applications stored on the local database 214 to memory 212 for execution on the API 210 when so desired by the user or invoked by another API. These download transactions are typically reported or obtained by a billing system that can generate the appropriate charges to the user of the client device among other activities discussed in greater detail below.

As used herein "client device", "wireless device", "client computing device" and like variations includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein. The client device can be serviced by at least one remote server as discussed herein. Some examples of client devices which may be used in accordance with embodiments of the present invention include cellular telephones or other wireless communication units, PDAs, paging devices, handheld navigation devices, handheld gaming devices, music or video content download units, and other like wireless communication devices.

The wireless communication between the client device 102 and the BTS 204 can be based on different technologies, such as code division multiple access (CDMA), time division multiple access (TDMA), frequency division multiple access (FDMA), the global system for mobile communications (GSM), or other protocols that may be used in a wireless communications network or a data communications network. The data communication is typically between the client device 102, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

Figure 3:
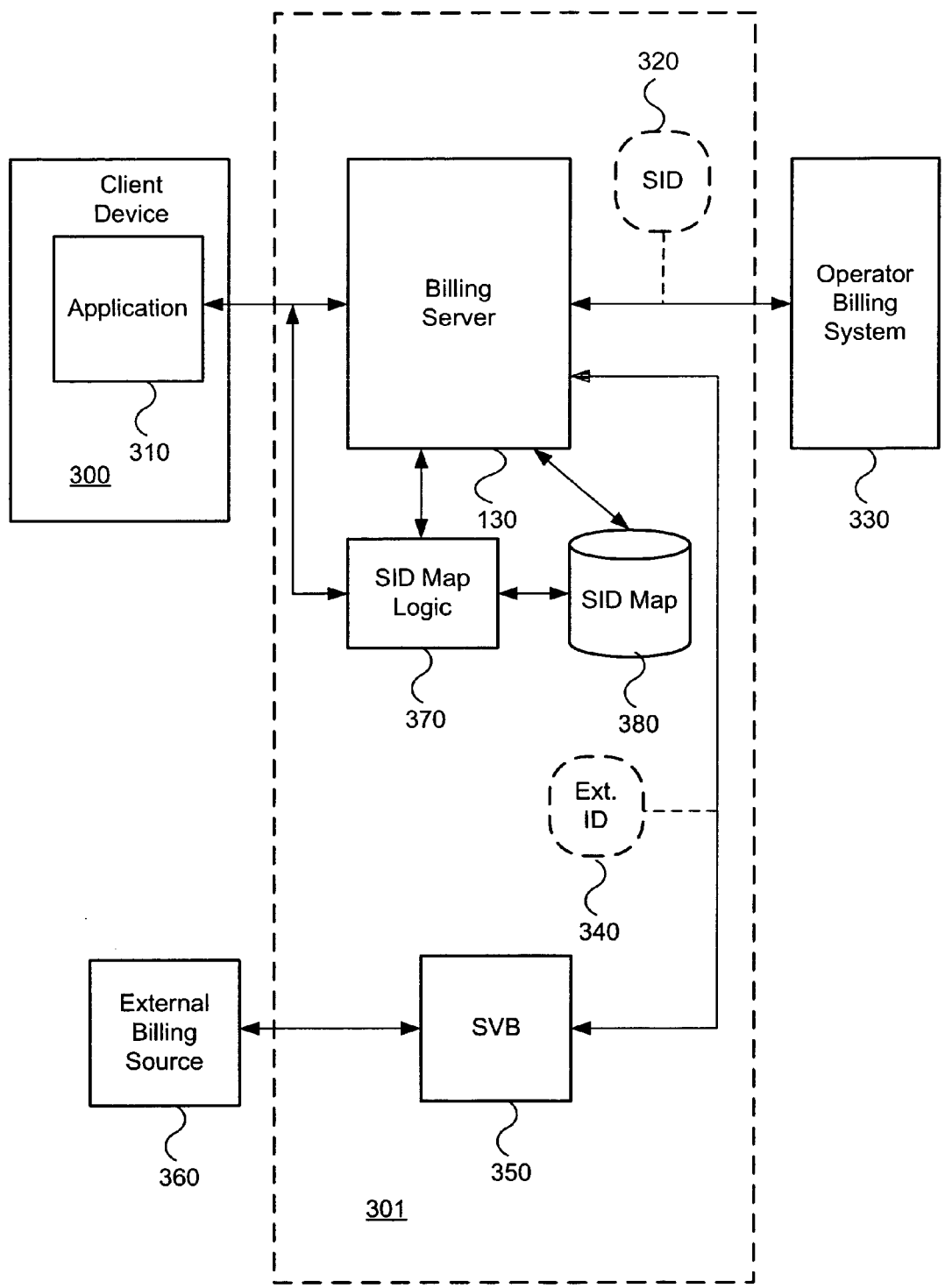
FIG. 3 is a block diagram of a wireless subscriber billing system architecture in accordance with at least one embodiment of the invention.

Referring to FIG. 3, a client device 300 is illustrated that includes an application 320 (e.g., a BREW® application) that includes the ability to securely communicate via a wireless network to the billing server 130/billing system 301. As discussed above, an ADS may function as a gateway to the billing server/billing system or other server may operate in this function. Accordingly, the embodiment illustrated in FIG. 3 is merely for illustrative purposes and should not be construed to limit the invention.

In addition to security functions, the communication between client device 300 and billing server 130 includes verification and identification logic to identify the client device and associate it with an internal account number or Subscriber Identification (SID) 320 that is used to associate the client device with a wireless subscriber's account by an operator billing system 330, as is known in the art. The SID typically is not related to the numbers easily ascertained from the client device such as the mobile directory number (MDN) or mobile identification number (MIN). Further, the SID 320 can be any agreed upon code between the billing server 130 and the operator billing system 330 that typically generates a bill to the subscriber. For example, a SID may be a fourteen digit number and may represent a variant of the MIN or the IMSI (e.g., 310006199772376). However, the invention is not limited to this format and the SID may be any agreed upon format such as an identification code containing numbers, characters, and/or symbols and the like.

FIG. 3 further illustrates a system in accordance with at least one embodiment of the invention that allows for service value billing from external (e.g., outside the wireless carrier network) billing sources 360, such as a retail merchant, external website and the like. A service value billing module (SVB) 350 can be included in a wireless subscriber billing system 301. The SVB 350 provides a billing portal for the external billing source 360 (e.g., third-party vendor, publisher, and the like) that are not part of the wireless carrier network. The SVB 350 allows the external billing source 360 to generate billing requests that are then processed through the billing system 301. In contrast to conventional systems that distribute and bill for applications directly selected from and downloaded to a client device within a carrier network, the SVB 350 allows for external transactions to be processed through the established wireless subscriber billing system 301.

An authentication feature can be included in the SVB 350 that can verify the identity of the external billing source 360 that is accessing the SVB module 350. For example, a digital certificate can be issued to the trusted service. The certificate will be associated with the carrier/operator and the trusted service (e.g., retail merchant) for validation. The external billing source 360 can digitally sign each transaction to the SVB 350 using the issued certificate. The digital signature and the digital certificate can be included in each request. The SVB 350 can then authenticate the signature on each billing request. For example, the SVB 350 can be a web-based interface and the connection to the SVB 350 can be via the Internet using an HTTPS protocol in the external billing source 360 authentication. However, those skilled in the art will appreciate that the invention is not limited to an internet connection and an HTTPS protocol and any combination of wired and/or wireless connection and suitable security/authentication system can be used to communicate the billing requests from the external billing source 360.

Accordingly, the wireless subscriber billing system 301 can receive a billing request from the external billing source 360 that is external to the carrier network. However, since the SVB-based billing events from the external billing source 360 are not directly generated within the carrier network or from the subscriber's client device 300, typically an external ID 340 will be associated with the transaction that is not the SID 320 used between the billing server 130 and the operating billing system 330. Further, for security, confidentiality and other reasons the SID 320 may not be made available outside the billing server 130 to operator billing system 330 communications. Accordingly, the external ID 340 has to be mapped to the SID 320 in order for the billing system 301 to communicate the billing request to the operator billing system 330.

A SID map database 380 can be used by the billing system 301 (e.g., SVB 350, billing server 130, or other logic module) to uniquely identify the subscriber. For example, a subscriber could use their Mobile Directory Number (MDN), e.g., the dialable phone number, mobile identification number (MIN), mobile station identity (MSID), international mobile station identity (IMSI) or other assigned unique number that can be associated with the wireless subscriber and/or client device. The MDN (or other unique number) can be transmitted with the billing request to the SVB 350. The SID map logic 370 can then access the SID map database 380 and replace the MDN or associate the MDN with the unique SID used in the billing system for processing the billing requests and transactions with the operator billing system.

However populating the SID database could be a labor intensive task given the millions of wireless client devices in use. Further not all wireless devices may be enabled for external purchases. Accordingly, SID map logic 370 can be used to automatically capture an external ID associated with the client device 300. The SID map logic 370 can further have the ability to determine the internal account number (e.g. SID) by using a heuristic that uses data obtained (e.g., the external ID) from the billing transaction between the wireless device 300 and the billing system 301. The SID map logic 370 can accept a variety of identification information (e.g., MDN, MIN, MSID, IMSI, and the like) for transactions generated by the external billing source and maps these data to an internal account number (SID) using data derived from a prior billing transaction between the wireless client device 300 and the billing system 301.

For example, during a billable event where the client device communicates with billing server 130 and billing system 301 to download an application and/or content from the wireless carrier network, a billing transaction is generated. Typically as part of the communication between the wireless client device 300 and billing system 301 identification data may be transmitted to the billing system for authentication and security purposes. For example, as part of the communication during the billable event the client device may include its MDN, MIN and other such identification information. Accordingly, the SID logic map can capture this external ID information and associate it with the SID which is communicated to the operator billing system. The SID map database 380 can store these associated IDs and can also be accessed to determine if an entry has already been made for a particular client device, so that redundant data is not stored.

If the wireless device is no longer valid (e.g., closed/transferred account, etc.) on an operator system, the operator may provide a notice (e.g., a provisioning file) to notify when the SID has been de-activated or transferred. This allows the system to mark the records in the SID mapping as inactive and when a SID is seen next (e.g., some time later when it's been reassigned to a new customer) the SID mapping can create a new active record with the SID and it's associated IDs that relate to the wireless device.

Additionally, it may be possible for a SID to map to more than one device (e.g., a common account is used for several wireless devices). In this case the system can track the SID and one or more other associated IDs in combination for each unique device. For example, the external ID can be used in combination with the SID that is retrieve and both can be communicated to the operator billing system to bill the appropriate account and provide additional reporting detail.

Those skilled in the art will appreciate that embodiments of the invention can include an apparatus in accordance with the foregoing description. For example, an embodiment of the invention can include an apparatus including logic configured to capture an external ID associated with a wireless client device from a billable event communicated between a wireless client device and a wireless subscriber billing system, and logic configured to associate the external ID with a subscriber ID (SID) used to communicate a billing request to an operator billing system (e.g., SID Map logic 370). Also, the apparatus can include a storage medium (e.g., 380) configured to store the associated external ID and SID.

The apparatus can further include logic (e.g., SVB 350) configured to receive a billing request from an external billing source at the wireless subscriber billing system, and logic (e.g., 370) configured to map the external ID contained in the billing request to the subscriber ID (SID). Additionally, the apparatus can further include logic (e.g., billing server 130) configured to communicate the billing request to the operator billing system.

Further, in embodiments of the invention the wireless subscriber billing system can be hosted by a third party that is separate from the operator and external billing source. For example, a wireless subscriber billing system can be configured such as QUALCOMM's BREW Billing and Distribution System (BDS) that can distribute applications and content to client devices, generate billing information to the operator billing system, and provide settlement services for the application and content providers. Using aspects of embodiments of the invention, the BDS can further be enhanced to allow external billing sources to access the billing system and using an external ID to communicate the appropriate billing information to the operator billing systems. Accordingly, the wireless subscriber billing system can be enhanced to process transactions external to the wireless operator/carrier network allowing a wireless subscriber a broader usage of their wireless account.

Figure 4:
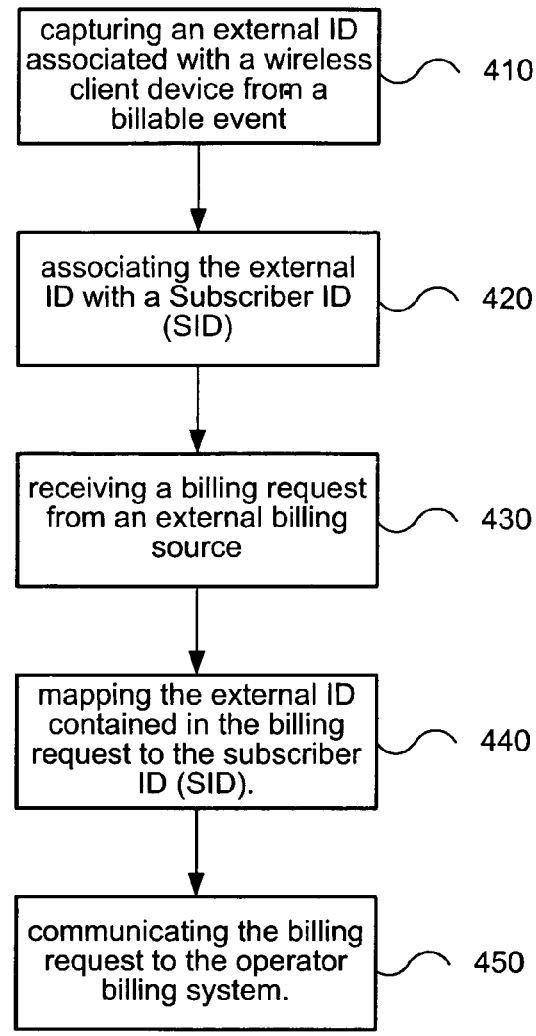
FIG. 4 is a flowchart illustrating a method of automated account mapping in a wireless subscriber billing system in accordance with at least one embodiment of the invention.

Those skilled in the art will appreciate that embodiments of the invention can include methods for performing the activities, functions and/or steps described herein. For example, referring to FIG. 4 a flowchart illustrating a method according to at least one embodiment of the present invention is illustrated. An external ID associated with a wireless client device is captured from a billable event communicated between a wireless client device and a wireless subscriber billing system, block 410. The external ID is associated with a Subscriber ID (SID) used to communicate a billing request to an operator billing system, block 420.

For example, a BREW download/billing acknowledgment message (event) may contain all the IDs that are associated with the client device and which can be recorded in the SID map. This data may be added to the headers of the message by the underlying Brew operating environment (or in the case of a non-BREW environment buy by the gateway infrastructure). Accordingly, the sending application (e.g, on the client device) does not need to know of, or have any control over the header values.

Alternatively, on a BREW client there can be specific API calls (e.g., IBilling, IDownload, and the like) that are invoked to create a billing event and communicate the IDs. In a non-Brew environment the values can be added by the operator's gateway infrastructure or in the negotiations between the client device and the gateway or by a program resident on the client device. These examples are provided for illustration only. Accordingly, embodiments of the invention are not limited to any specific platform or data communication format and can include any system that can capture and associate the SID information automatically with respect to a billable/download event.

After the association is made the billing system can process external billing requests using the external ID. For example, a billing request can be received from an external billing source at the wireless subscriber billing system, 430 and the external ID contained in the billing request can be mapped to the subscriber ID (SID), block 440. The billing request can be communicated to the operator billing system, block 450. Accordingly, an external ID such as the MDN of the client device can be used to purchase an item from an external billing source (e.g., retail store, website, and the like) and the MDN (e.g., external ID) can be transmitted along with the other billing information (e.g., purchased item description, purchase amount, and the like) to the billing system. The external ID can be associated with the SID (internal account number) then the transaction can be communicated using the SID to the operator billing system, which will then generate the appropriate billing to the wireless subscriber.

As previously discussed, to promote security of the transaction between the external billing source and the billing system the billing request can be digitally signed at the external billing source prior to transmitting the billing request. Additional security, verification and authorization procedures can be defined by the system designer to prevent fraud based on the system design and/or policies of the operator, as will be appreciated by those skilled in the art and all these variations are contemplated to be within the scope of the present invention. Likewise, the external ID and internal account number (e.g., SID) may be defined as needed by the system designers and is not limited to a mobile directory number (MDN), mobile identification number (MIN), mobile station identity (MSID), and/or international mobile station identity (IMSI). Further, more than one of the external IDs may be used and be associated with the SID. For example, both the MDN and the MIN may be captured and associated with the SID and one or both may be required for processing the billing requests from the external billing source. The associated external ID(s) and SID can be stored in a storage medium for ease of retrieval and organization, as discussed in the foregoing.

In further embodiments, those skilled in the art will appreciate that the foregoing methods can be implemented by the execution of a program embodied on a computer readable medium, such as the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, or EEPROM), flash memory cards, an optical storage device (e.g. CD-ROM, WORM, DVD, digital optical tape), paper "punch" cards, or other suitable data storage media including digital and analog transmission media.

Accordingly, an embodiment of the invention can include a computer-readable medium on which is stored a computer program for automated account mapping in a wireless subscriber billing system. The computer program comprising instructions which, when executed causes the computing device (which can include multiple computing devices) to perform the process of capturing an external ID associated with a wireless client device from a billable event communicated between a wireless client device and a wireless subscriber billing system, and associating the external ID with a Subscriber ID (SID) used to communicate a billing request to an operator billing system.

Further, those skilled in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Additionally, the illustrated embodiments show separation of block elements merely for convenience of illustration and the functionalities of the various elements may be separated or integrated as desired. For example all the elements of billing system 301, can be integrated into one common device or may be distributed over several servers each in communication with each other. Skilled artisans may implement the described functionality in varying ways for each particular application, but such implementation decisions should not be interpreted as causing a departure from the scope of embodiments of the present invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Accordingly, the foregoing description should not be interpreted to limit the scope of the invention which is defined by the appended claims and the equivalents thereof.

What is claimed is:

1. A method comprising:
capturing an external ID associated with a wireless client device from a billable event communicated between the wireless client device and a wireless subscriber billing system;
associating the external ID with a Subscriber ID (SID) used to communicate a billing request from the wireless subscriber billing system to an operator billing system;
receiving an external billing request from an external billing source at the wireless subscriber billing system, the external billing request including the external ID; and
mapping the external ID contained in the external billing request to the SID, after the external billing request is received from the external billing source.

2. The method of claim 1, further comprising:
communicating the external billing request to the operator billing system.

3. The method of claim 1, further comprising:
digitally signing the external billing request at the external billing source prior to transmitting the external billing request.

4. The method of claim 1, wherein the external ID comprises at least one of a mobile directory number (MDN), mobile identification number (MIN), mobile station identity (MSID), and international mobile station identity (IMSI).

5. The method of claim 1, further comprising:
storing the external ID and the SID in a storage medium.

6. The method of claim 1, wherein the external ID is captured during a first download transaction between the wireless client device and a carrier network that generates the billable event.

7. The method of claim 1, wherein the SID is not provided to the external billing source.

8. The method of claim 1, wherein the external billing request is received after the associating, and wherein the external ID is mapped to the SID after the receiving.

9. An apparatus comprising: a processor coupled to memory and configured to:
capture an external ID associated with a wireless client device from a billable event communicated between the wireless client device and a wireless subscriber billing system;
associate the external ID with a Subscriber ID (SID) used to communicate a billing request from the wireless subscriber billing system to an operator billing system;
receive an external billing request from an external billing source at the wireless subscriber billing system, the external billing request including the external ID; and
map the external ID contained in the external billing request to the SID, after the external billing request is received from the external billing source.

10. The apparatus of claim 9, wherein the processor is further configured to communicate the external billing request to the operator billing system.

11. The apparatus of claim 9, wherein the external ID comprises at least one of a mobile directory number (MDN), mobile identification number (MIN), mobile station identity (MSID), and international mobile station identity (IMSI).

12. The apparatus of claim 9, further comprising:
a non-transitory storage medium configured to store the external ID and the SID.

13. The apparatus of claim 9, wherein the external ID is captured during a first download transaction between the wireless client device and a carrier network that generates the billable event.

14. The apparatus of claim 9, wherein the apparatus is the wireless subscriber billing system hosted by a third party other than the operator billing system or the external billing source.

15. A non-transitory computer-readable storage medium including instructions, which, when executed by a machine cause the machine to perform operations, the instructions comprising:
at least one instruction for causing the machine to capture an external ID associated with a wireless client device from a billable event communicated between the wireless client device and a wireless subscriber billing system;
at least one instruction for causing the machine to associate the external ID with a Subscriber ID (SID) used to communicate a billing request from the wireless subscriber billing system to an operator billing system;
at least one instruction for causing the machine to receive an external billing request from an external billing source at the wireless subscriber billing system, the external billing request including the external ID; and
at least one instruction for causing the machine to map the external ID contained in the external billing request to the SID, after the external billing request is received from the external billing source.

16. The non-transitory computer-readable storage medium of claim 15, further comprising instructions which, when executed by the machine, cause the machine to perform operations, the instructions comprising:
at least one instruction for causing the machine to communicate the external billing request to the operator billing system.

17. The non-transitory computer-readable storage medium of claim 15, further comprising instructions which, when executed by the machine, cause the machine to perform operations, the instructions comprising:
at least one instruction for causing the machine to decrypt the external billing request, wherein the external billing request was encrypted at the external billing source prior to transmitting the billing request.

18. The non-transitory computer-readable storage medium of claim 15, wherein the external ID comprises at least one of a mobile directory number (MDN), mobile identification number (MIN), mobile station identity (MSID), and international mobile station identity (IMSI).

19. The non-transitory computer-readable storage medium of claim 15, further comprising instructions which, when executed by the machine, cause the machine to perform operations, the instructions comprising:
at least one instruction for causing the machine to store the external ID and the SID in a storage medium.

20. The non-transitory computer-readable storage medium of claim 15, wherein the external ID is captured during a first download transaction between the wireless client device and a carrier network that generates the billable event.

21. A server comprising:
means for capturing an external ID associated with a wireless client device from a billable event communicated between the wireless client device and a wireless subscriber billing system;

means for associating the external ID with a Subscriber ID (SID) used to communicate a billing request from the wireless subscriber billing system to an operator billing system;

means for receiving an external billing request from an external billing source at the wireless subscriber billing system, the external billing request including the external ID; and means for mapping the external ID contained in the external billing request to the SID, after the external billing request is received from the external billing source.

22. The server of claim 21, further comprising:
means for communicating the external billing request to the operator billing system.

23. The server of claim 21, wherein the external ID comprises at least one of a mobile directory number (MDN), mobile identification number (MIN), mobile station identity (MSID), and international mobile station identity (IMSI).

24. The server of claim 21, further comprising:
means for storing the external ID and the SID in a storage medium.

25. The server of claim 21, wherein the external ID is captured during a first download transaction between the wireless client device and a carrier network that generates the billable event.

* * * * *